May 6, 1924.
J. BENSON
1,493,234
FISHING TOOL FOR DEEP WELLS
Filed June 2, 1923    2 Sheets-Sheet 1
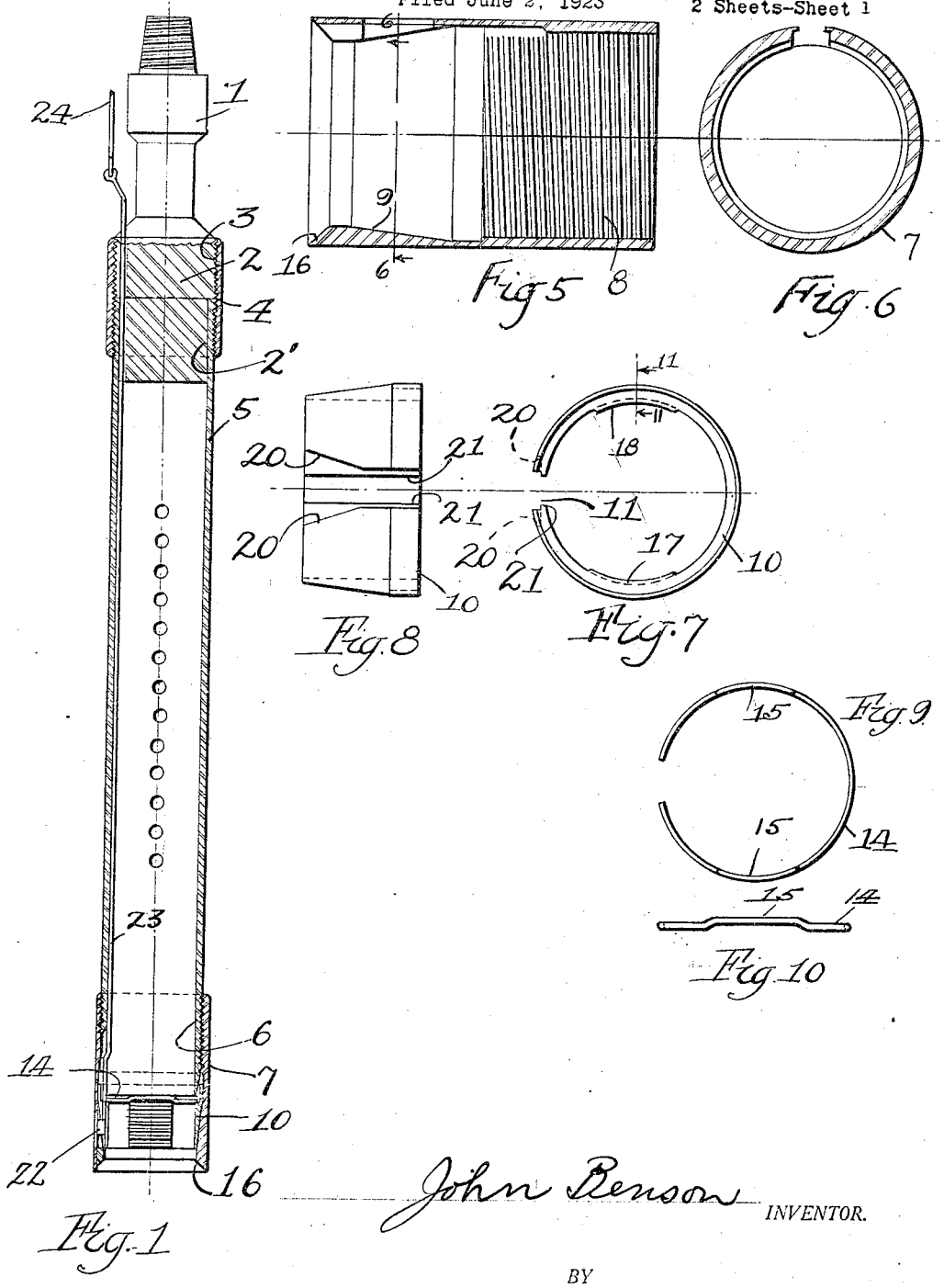

May 6, 1924.
J. BENSON
1,493,234
FISHING TOOL FOR DEEP WELLS
Filed June 2, 1923  2 Sheets-Sheet 2
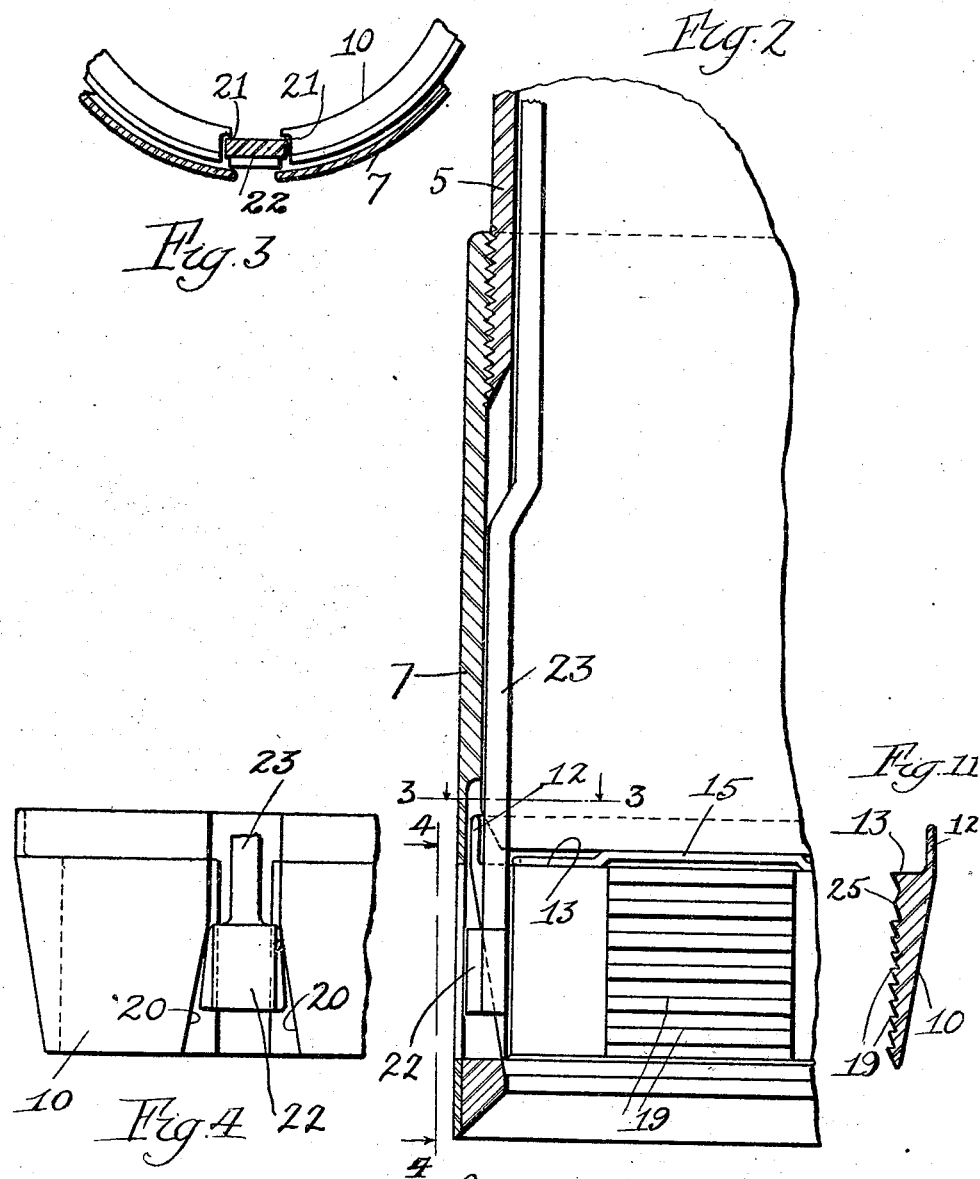

Patented May 6, 1924.

1,493,234

UNITED STATES PATENT OFFICE.

JOHN BENSON, OF WEST CHICAGO, ILLINOIS.

FISHING TOOL FOR DEEP WELLS.

Application filed June 2, 1923. Serial No. 642,996.

*To all whom it may concern:*

Be it known that I, JOHN BENSON, a citizen of the United States, and a resident of West Chicago, county of Du Page, and State of Illinois, have invented certain new and useful Improvements in Fishing Tools for Deep Wells, of which the following is a specification.

The general object of my invention is to provide a fishing tool for deep wells which shall be so constructed that the hold or grip of the tool can be released when in the well, as well as when the tool has been withdrawn from the well.

It is also an object of my invention to provide a finishing tool which can be quickly and easily reset to gripping position, and without the necessity of taking the device apart.

Another object of my invention is to provide a construction whereby the hold upon a drill, or other part to be recovered, which cannot be raised, can be released without danger of breakage of the parts.

I aim also to simplify the construction and operation of such devices and to cheapen the cost of manufacture thereof.

My invention consists generally in a device of the form, arrangement, construction and co-operation of the parts whereby the above named objects, together with others that will appear hereinafter, are attainable, and my invention will be more readily understood by reference to the accompanying drawings, which illustrate what I consider, at the present time, to be the preferred embodiment thereof.

In said drawings:

Fig. 1 is a central longitudinal sectional view of a device embodying my invention.

Fig. 2 is an enlarged detail fragmentary sectional view of the lower part of the device.

Fig. 3 is a detail view substantially on the line 3—3 of Fig. 2.

Fig. 4 is a fragmentary face view viewed substantially along the line 4—4 of Fig. 2.

Fig. 5 is a detail sectional view of a sleeve-like head portion positioned at the lower end of the device.

Fig. 6 is a sectional view substantially on the line 6—6 of Fig. 5.

Fig. 7 is a top plan view of the grab element.

Fig. 8 is a side elevation of the element shown in Fig. 7.

Fig. 9 is a plan view of a spring element used in the head.

Fig. 10 is an edge view of the member shown in Fig. 9; and

Fig. 11 is an enlarged sectional view substantially on the line 11—11 of Fig. 7.

In the drilling of deep wells, it frequently occurs that the drill or some other part of the drilling equipment becomes shattered or broken after the well has been drilled to a considerable depth and it is necessary that these parts be removed or recovered. This is often a difficult operation, especially in a deep well and with the devices heretofore devised it has been necessary to remove the fishing tool or device from the well before it could be released from the drill or other part which it gripped. This practice causes considerable delay and, in some instances, it is impossible, after the fishing tool has gripped the drill or other part, to raise the parts or to release the fishing tool with the result that breakage must be resorted to. I have devised a simple construction which overcomes these objectionable features.

Referring now to the drawings for the details of construction, my device comprises an upper portion 1 which is in the nature of a shank and of the general shape and form used in well drilling equipment so that it can be easily adapted thereto.

The lower portion 2 of said shank is provided with external threads 3 so that it is adapted to receive the coupling member 4 to which a section of ordinary pipe 5 is attached, the portion 2 being of reduced diameter, as indicated at 2' to accommodate said pipe 5. The pipe 5 is also threaded at its lower end 6 to receive what I shall term a grab receiving head 7. The grab receiving head 7 is cylindrical in form and as shown is provided with the interiorly threaded portion 8 for co-action with the screw threads of the end 6 of said pipe 5. The lower portion of the grab receiving head 7 is provided interiorly with a downward and inwardly extending portion 9 forming a wedge surface for the reception of the grab element 10. The grab element 10, as here shown, is in the form of a ring which is split or open at one point 11 and, as shown, is positioned within the grab receiving head 7 where it springs outwardly into engagement with the tapered portion 9 of said head. The grab element 10 is provided with an upwardly extending rib or wall 12 and a ledge portion 13, best shown in Fig. 11. Positioned on the ledge 13 and interposed between said ledge and the lower end 6 of the pipe 5, is a spring ring 14 provided with offset portions 15.

The other structural characteristics of the device will probably be best understood by a description of its use. The device is, of course, lowered into the well until the grab receiving head 7 comes into contact with the drill or other device to be removed, the lowermost portion of the head 7 being beveled inwardly, as indicated at 16, to direct the engaged device into the central opening of the fishing tool, so that the fishing tool may pass downwardly over said drill or other part until the serrated portions 17 and 18 of the grab 10 come into engagement with the drill shank or other part. For convenience, we will assume that the part to be removed is a broken drill, but this should be understood to be by way of illustration and not by way of limitation.

Thereupon the teeth 19 of said serrated portion engage the drill to be removed. When the drill is thus engaged and the fishing device is lifted, the tendency is to draw the gripping element 10 downwardly on the beveled surface 9 which the more tightly causes engagement of the teeth 19 with the tool. Assuming that the drill has been thus properly gripped and can be extracted, the whole fishing tool is pulled upwardly and when the drill has been freed from the well the head 7 is moved downward relative to the gripped drill, a slight amount of such movement being permitted because of the interposed spring element 14 with its offset spring portions 15. Thereupon the grab element 10 is free to be expanded by means which I shall now describe.

It will be observed that adjacent the slot 11 the grab element 10 is provided with cutaway or bevelled faces 20. These faces 20 are not cut entirely through the ring so that extending ledge portions 21 are provided. A wedge shaped member 22 is provided and which is confined between the wall of the head 7 and the ledge portions 21 of the element 10 as is best shown in Fig. 3. Thus the wedge portion 22 is confined to vertical movement. For operation the wedge member 22 is attached to or is a part of a rod 23 which extends upwardly through the pipe 5 and through the portion 2 of the shank 1. Obviously, by pulling the element 22 upwardly relative to the grab ring 10 the ring is expanded and the teeth 19 thereof are released from engagement with the recovered drill and the parts may be readily separated. To restore the parts to working or gripping position it is but necessary to push down on the rod which moves the wedge portion 22 downward relative to the gripping ring 10 and permit it to spring together.

There are instances when the fishing tool will grip a drill which it will be unable to raise and with constructions heretofore provided it has not been possible always to release the grip of the fishing tool on the drill with the result that both the fishing tool and the drill are lost against recovery. With my construction, however, it is possible to "break" the hold of the fishing tool on the drill when it is down in the well because the head 7 can be moved downward relative to the drill which will ordinarily permit expansion of the gripping ring 10 by pulling upward on the cable 24 that is attached to the rod 23. In some instances, however, the gripping ring 10 is wedged so tightly between the wedge surface 9 of the head 7 and the drill to be recovered that movement of the head 7 relative to the gripping ring 10 cannot take place. Under such circumstances it would, of course, be impossible to expand the ring 10 to "break" the grip. To overcome this difficulty I have designed the drill engaging portion of the gripping ring 10 in a special manner which will be best understood by reference to Fig. 11.

As before stated when the drill has been engaged and it is attempted to raise the fishing device the teeth 19 tend to imbed themselves in the drill and the ring 10 sliding downward on the wedge or incline surface 9 binds the wedge ring very tightly in place. If it is impossible to raise the drill the grip of the ring 10 must be released which requires that it move upward relative to the head 7, i. e. by the head moving downward. To prevent the gripping ring 10 from moving downward I have provided an inverted tooth 25 which engages the drill and prevents the ring 10 from moving downward with the head 7. The ring 10 then is spaced from the wedge surface 9 and can be expanded in the manner before described.

The ring 10 is here shown with but two gripping portions 17 and 18 but if desired the gripping teeth may extend completely around the interior of the ring.

The many advantages of my device will be understood by those skilled in this art without further comment.

I claim:—

1. A fishing tool for deep wells embodying therein a grab-head, a one piece split ring disposed within the head and having grab portions associated therewith, the ring and the head having coacting means for effecting contraction of said ring to cause said grab portions to engage the tool to be recovered, and means operable when the fishing tool is in the well for effecting exhaustion of said ring to release said grab portions from the tool to be recovered.

2. A fishing tool for deep wells embodying therein a grab-head, a one piece split ring disposed within the head and having grab portions associated therewith, the ring and the head having coacting means for effecting contraction of said ring to cause said grab portions to engage the tool to be recovered, and manually controlled means operable when the fishing tool is in the well for effecting exhaustion of said ring to release said grab portions from the tool to be recovered.

3. A fishing tool for deep wells embodying therein a grab-head, a one piece split grab ring positioned therein, a stop shoulder in said grab head, a spring element interposed between said shoulder and the split grab ring, and means for effecting release of the grab-ring from the device to be recovered.

4. A fishing tool for deep wells embodying therein a grab-head, a one piece split grab ring positioned therein, a spring element arranged in said grab-head and positioned to resist movement of said ring in one direction, and means for effecting release of the grab ring from the device to be recovered.

5. A fishing tool for deep wells embodying therein a grab-head, grab means in the form of a one piece split ring associated therewith and movable longitudinally in one direction to grip the tool to be recovered and in the other direction to permit release, and means for effecting release of the grab elements when the fishing tool is in the well.

6. A fishing tool for deep wells embodying therein a grab-head, grab means in the form of a one piece split ring associated therewith and movable longitudinally in one direction to grip the tool to be recovered and in the other direction to permit release, yieldable means tending to resist movement of the grab means in one direction, and means for effecting release of the grab elements when the fishing tool is in the well.

7. A fishing tool for deep wells embodying therein a grab-head, grab means in the form of a one piece split ring associated therewith and movable longitudinally in one direction to grip the tool to be recovered and in the other direction to permit release, and wedge means for effecting release of the grab elements when the fishing tool is in the well.

8. A fishing tool for deep wells embodying therein a grab-head, a one piece split grab-ring associated therewith, means for effecting release of the grab-ring from the gripped device, said means including a rod extending longitudinally of the device.

9. A fishing tool for deep wells embodying therein a grab-head, a one piece split grab-ring carried thereby, and a wedge element positioned for movement relative to the grab-ring for expanding it for the purpose specified.

10. A fishing tool for deep wells embodying therein a grab-head, a one piece split grab-ring carried thereby, and a wedge element positioned for movement relative to the grab-ring for expanding it for the purpose specified, said wedge being carried by a rod positioned longitudinally of the fishing tool.

11. A fishing tool for deep wells embodying therein, a grab-head, grab means associated therewith, said grab means having a tooth-like portion carried thereby and formed with a tooth adapted to engage the tool to prevent undesired downward movement of the grab means when release of the grab means from the gripped device is being effected.

12. A fishing tool for deep wells embodying therein, a grab-head, grab means associated therewith, said grab means having a tooth-like portion carried thereby formed to engage the tool and thereby prevent undesired downward movement of the grab means when release of the grab means from the gripped device is being effected, and oppositely formed tooth-like portions for gripping the device to be removed.

In testimony whereof, I have hereunto set my hand, this 29 day of May, 1923.

JOHN BENSON.